United States Patent Office 3,161,110
Patented Dec. 15, 1964

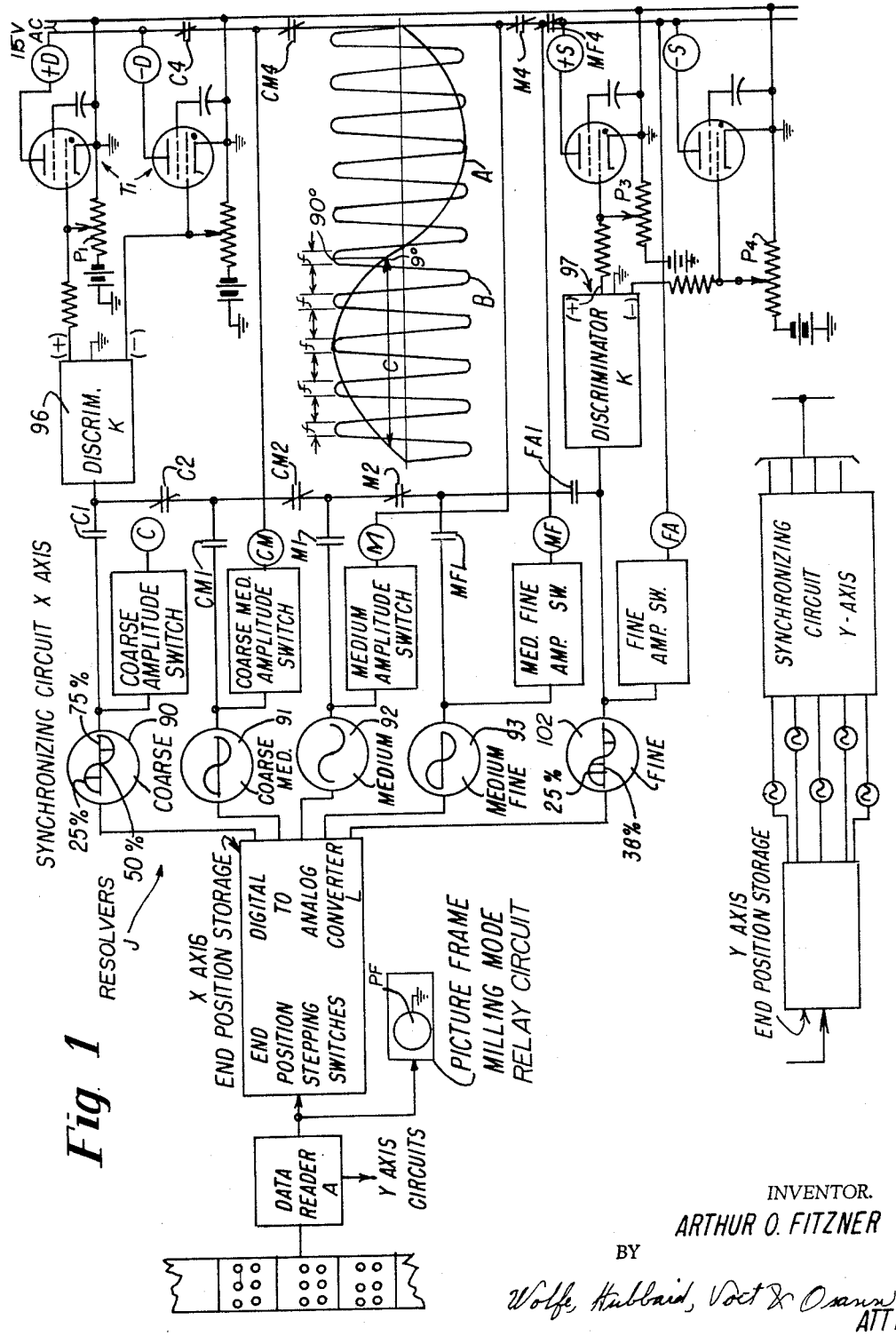

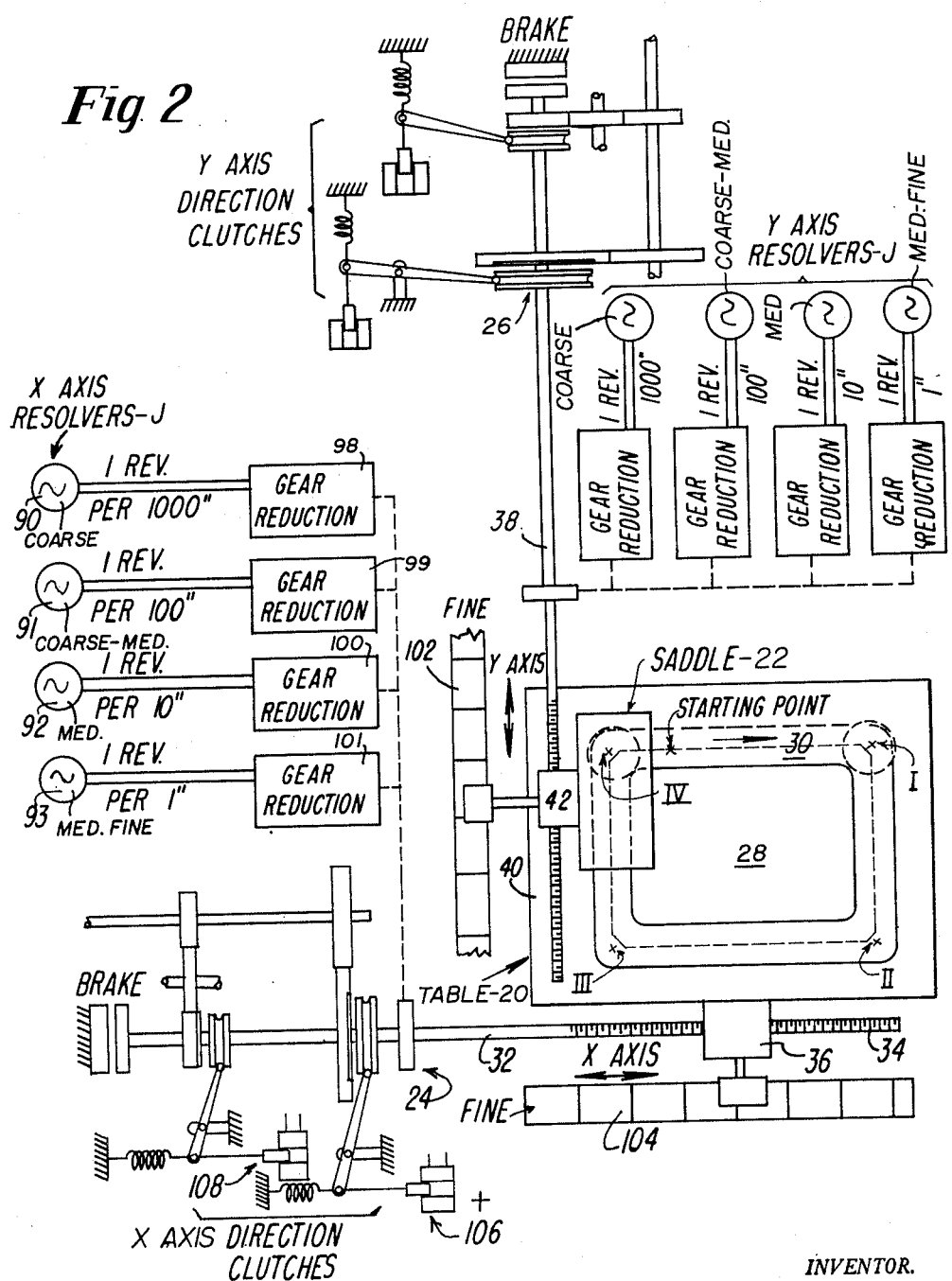

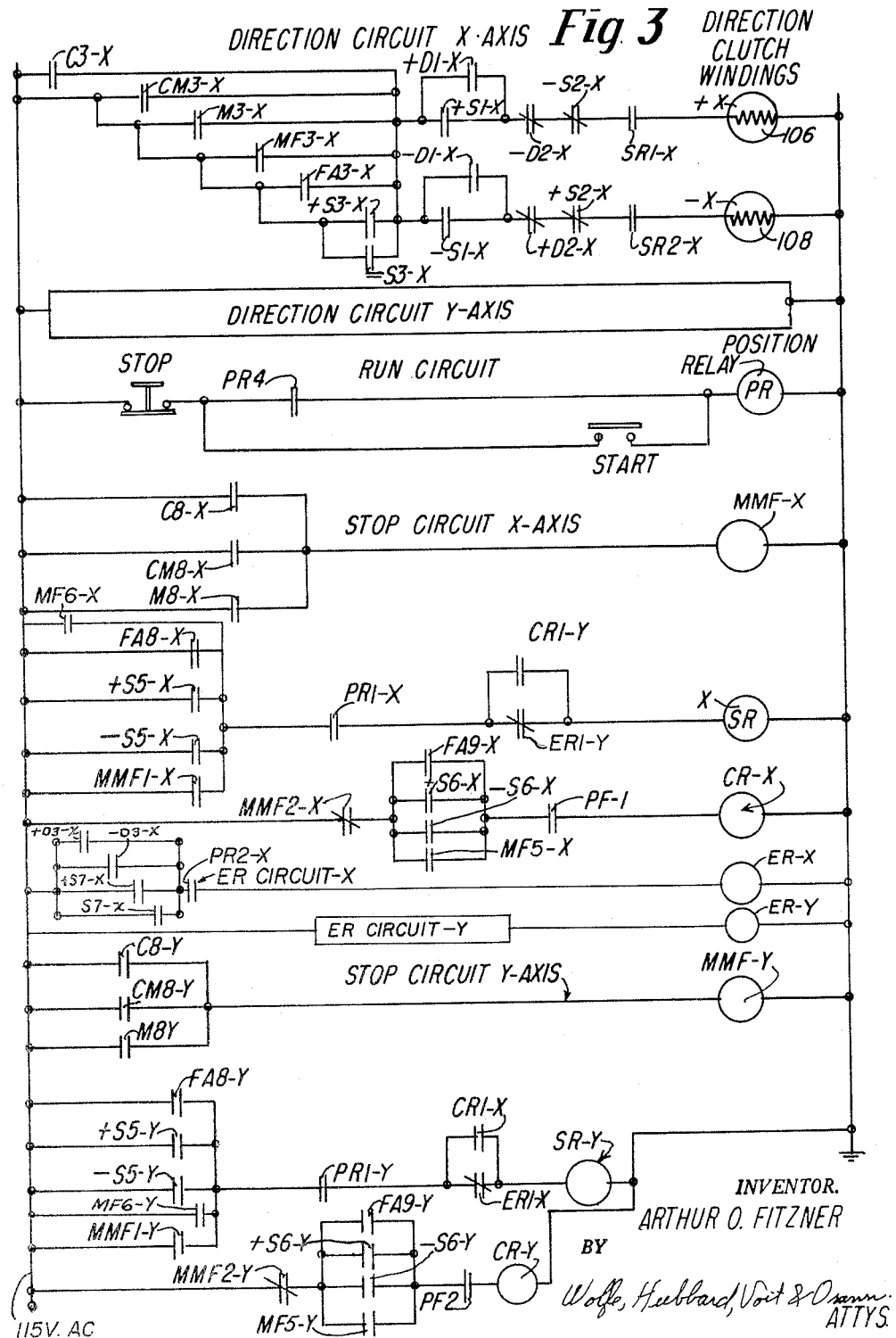

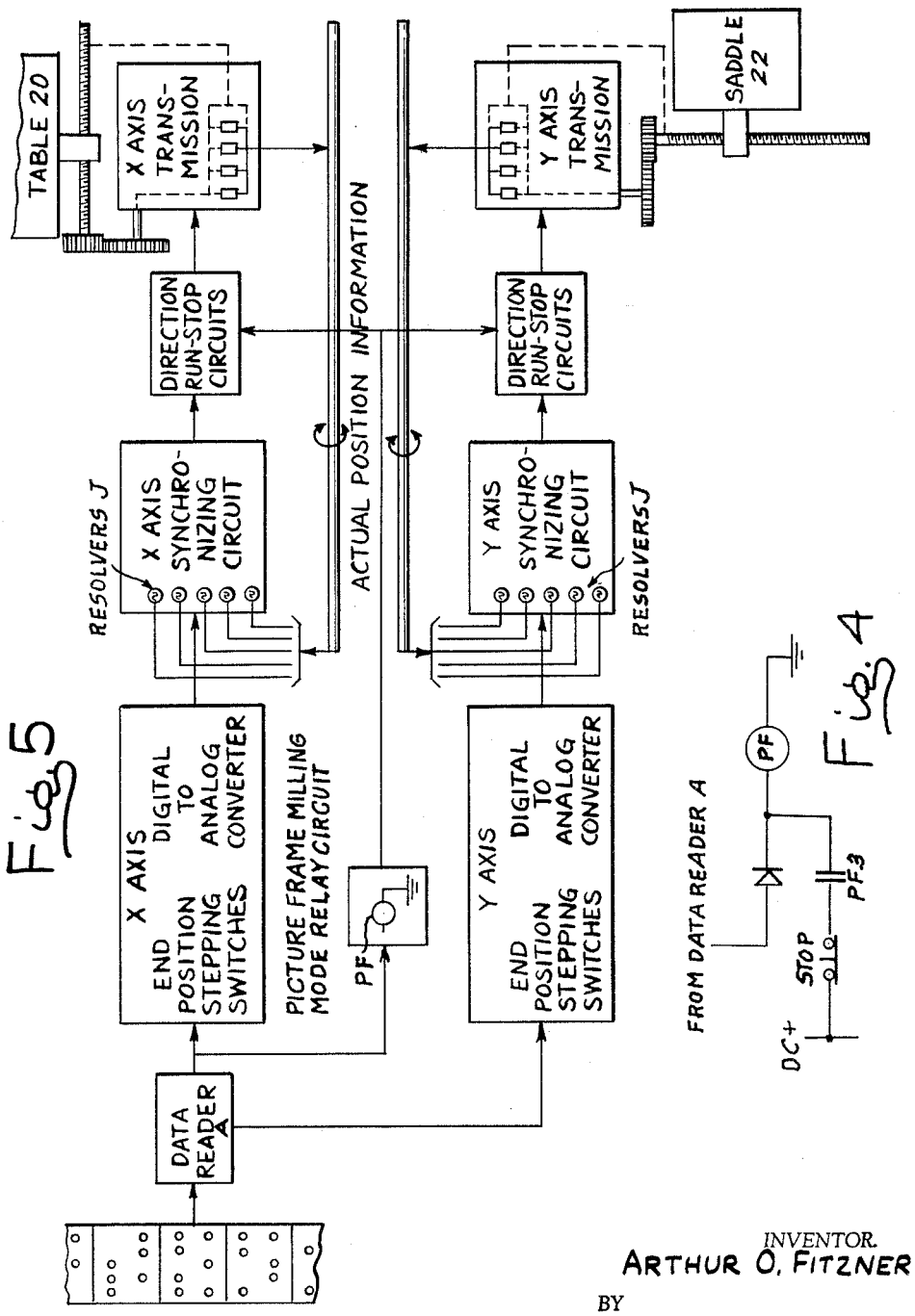

3,161,110
CONTROLS FOR MACHINE TOOLS AND THE LIKE
Arthur O. Fitzner, Fond du Lac, Wis., assignor to Giddings & Lewis Machine Tool Company, Fond du Lac, Wis., a corporation of Wisconsin
Filed Oct. 2, 1961, Ser. No. 142,102
4 Claims. (Cl. 90—13)

This invention relates in general to system for controlling machine tools, and relates more particularly to improvement in numerical control systems for machine tools.

This invention is particularly applicable to point-to-point positioning systems by means of which machine tool members are positioned to successive end points measured along any of the orthogonal axes of control. With such systems, the machine members are brought to a stop at each successive end point. In face milling operations to produce flat surfaces, dwell marks will be produced whenever the milling cutter is stopped. The present invention is addressed to the problem of eliminating such dwell marks.

The main objective of the invention is to provide means to be incorporated in numerical control systems for machine tools to obtain the proper motions and time sequencing of motions for milling operations to machine surfaces to a high degree of flatness. A related object is to provide control means for controlling face milling cutter motion to eliminate dwell marks at points where the cutter changes direction in milling a flat surface.

A further related object is to provide means for controlling face milling cutter motion whereby a short distance before the end point along one axis, the cutter is started to travel along the succeeding axis, such that for a short interval the cutter motion is along both axes, and the cutter is kept moving as its direction is changed.

Other objects and advantages will become apparent as the folowing description proceeds, taken in connection with the accompanying drawings, in which:

FIGURE 1 is a block and line diagram of portions of a control system embodying the features of the invention;

FIG. 2 is a diagrammatic illustration of transmissions for driving machine tool members together with gear reduction units and resolvers for detecting the physical location of the machine tool members;

FIG. 3 is a schematic wiring diagram of portions of the system represented in FIGURE 1;

FIG. 4 is a schematic wiring diagram of the picture frame milling mode relay circuit shown in block form in FIG. 1; and FIG. 5 is a block and line diagram of the overall control system embodying features of the invention as applied to the operation of the machine tool components.

While the invention has been shown and will be described in some detail with reference to a particular embodiment, there is no intention that it be limited to such detail. On the contrary, it is intended here to cover all modifications, alternatives, and equivalents falling within the spirit and scope of the invention as defined in the appended claims.

Turning to FIGURES 1 and 2, there is shown a control system for machine tool members, herein shown as a table 20 and saddle 22, illustratively, of a milling machine. The table 20 is movable horizontally in a forward and reverse direction under the control of a table transmission 24, and the saddle 22 is also movable in a forward and reverse direction by means of a saddle feed transmission 26. Motors (not shown) provide the power required to drive the various elements of the transmissions so as to provide table motion in either direction along the conventional X axis and to provide motion in either direction of the saddle along the conventional Y axis. It will be understood that the table will be supported in the usual manner on a machine bed for movement in a horizontal plane and the saddle may be carried for motion transversely of the table by any suitable column or rail structure.

As shown in FIG. 2, a workpiece 28 is fixed to the table having a flat upper surface 30, positioned to be machined by a power operated face milling cutter carried by the saddle. The table and, therefore, the workpiece, may be moved back and forth responsive to power applied through the table transmission drive shaft 32 and feed screw 34 to a nut 36 which is attached to the table 20. The saddle 22 is similarly mounted for movement back and forth responsive to a power applied through the saddle transmission drive shaft 38 and feed screw 40 to a nut 42 which is attached to the saddle 22.

For convenience in reference, when the saddle 22 moves toward the top of FIG. 2, the machine tool members are said to be moving in the +Y direction and when the table 20 moves to the left in this figure, the members are said to be moving in the +X direction. In milling the surface of the workpiece, illustratively in a sequence of machining steps from the starting point successively to end points I, II, III, IV and to the "starting point" as a final end point, relative movement of the table in the +X direction will cause the face milling cutter to move from the starting point toward the first end point I. When the first end point I has been reached, the saddle will be caused to move in the −Y direction until the end point II is reached. Further motion of the table in the −X direction, to the right in the figure, will cause the workpiece and cutter to be moved relative to each other until the milling cutter reaches the end point III. Movement from point III to end point IV will be produced by motion of the saddle in the +Y direction, and movement from the end point IV to the starting point to complete the machining sequence on the piece will be produced by relative movement in the +X direction.

For this purpose, the control system, as shown in FIGURE 1, comprises a data input device or reader A which is adapted to supply successive sets of information which will govern the operation of machine tool members during the succeeding steps of the overall machine operation. The reader A may, for example, be a punched tape reader which accepts a punched tape having rows of holes therein digitally representing symbols or numerals for the various adjustable conditions of this machining process.

By means of the control system diagrammatically illustrated in FIGURE 1, the machine tool members, under direction of numerical control signals derived from a record such as the punched tape, will be caused automatically to execute the proper motions to move the members successively to the programmed end points and machine the workpiece.

It will be understood that in usual automatic machining modes of operation, point-to-point positioning, for example, to the end points I, II, III and IV, contemplates that the programmer will include at the beginning of the series of blocks of data on the tape covering the successive X and Y motion, direction for feeds and speeds, and the machine tool will be caused to execute the commands issued from the tape to carry out the series of machining steps covered by the series of blocks. At the beginning of the series of blocks, furthermore, there is also included a designation of the machining mode. Usual machining modes are "manual" and "automatic."

The present invention contemplates a mode of machining which will be called "picture frame milling." In the picture frame milling mode, according to one of the major features of the present invention, the control system includes means for controlling the motion of the machine tool member so as to eliminate dwell at the end points I, II, III and IV where the face milling cutter changes direction from movement along one axis to movement along the succeeding programmed axis. In keeping with the present invention, the control causes motion along the next succeeding axis to start at a point before the preceding feed motion is terminated and the preceding end point has been reached. In accordance with usual practice, one axis of motion will be programmed at a time. Thus the machine tool members will be caused, responsive to the data in the first block of the series, to move along the programmed axis at the programmed feed rate toward the end point for the first block of data.

The tape reader A is constructed and arranged in the usual manner so that while the first command is being executed and the machine tool members are proceeding toward the first end point, the tape reader A will be reading the next block of data on the tape. In usual machining modes, the tape reader A will encounter a hold-back restraint preventing the data in the second block of tape from being transmitted through the control system to change the motion of the machine tool members until the first end point has been reached. However, where the next block of data commands motion along a different axis which does not affect the axis in use, the end position code will be fully read and the end position stepping switches for the other axis, constituting the end position storage, driven to the position representing the next end point. When carrying out the picture frame milling mode of operation, moreover, a short distance ahead of the end point for motion along one axis, the control initiates start of the motion along the other axis to the end point stored in the end position storage stepping switches.

In carrying out the picture frame milling mode of operation, means are employed to detect the physical position of the movable machine tool members as they are driven along the respective X and Y axes. As shown in FIGURES 1 and 2, the system includes a positioning servo system including digital-to-analog converters L, resolvers J and discriminators K for both the X and Y axes. The digital-to-analog converters L, resolvers J and discriminators K operate to produce an error signal whenever there is a discrepancy between the end point position represented by the data stored in a block on the tape and covering the motion of the machine tool members along an individual axis toward the end point, and the actual position of the translatable element being controlled, that is, either the table 20 or the saddle 22. After a block of information has been read by the data reader A, an error signal indicating displacement to the end point from the actual position of the saddle 22 or the table 20 is utilized to cause movement of the respective machine toool member in a direction determined by the status of the machine direction clutches at a relative feed rate determined by the status of the machine feed or drive transmission.

The end position storage (FIGURE 1) and the associated digital-to-analog converters L and resolvers J taken together with the discriminators K may take the detailed form which is more fully disclosed in FIGS. 1, 2 and 9, respectively, of my U.S. Patent No. 3,040,221 assigned to the assignee of the present application. Those components have been shown in diagrammatic form in FIGURE 1. As disclosed in the United States patent referred to, the position storage is constituted by a plurality of stepping switches which are set in accordance with end position information to angular positions numerically and digitally representing the desired end position. Such stepping switches control digital-to-analog converters which, in turn, produce analog excitation signals for stator windings of coarse, coarse-medium, medium and medium-fine resolvers, 90, 91, 92 and 93 for the X axis, in the form of A.C. voltages proportional to the sine and cosine function of the angle $\theta$ which corresponds to the programmed end point for the table along the X axis. These four resolvers have rotors which are electrically connected to coarse and fine discriminators 96, 97 of an X axis synchronizing circuit.

These rotors are mechanically connected to be driven in timed relation to the movement along the X axis of the translatable table 20 through successive sets of reduction gears 98, 99, 100 and 101, the gear ratios being chosen preferably such that the rotor of the coarse resolver 90 turns at the rate of one revolution per 1000", for the gear ratios for the other resolver are reduced in tenth steps. Each such resolver 90, 91, 92, 93 thus has a moving rotor which is mechanically connected to shift in accordance with the position of the associated movable tool member via the gear drives. If any of the resolver rotors is at any angle except $\theta$ representing the programmed end point, it produces an A.C. error signal the amplitude of which is proportional to the discrepancy between the programmed location and the physical position of the movable member and the phase sense of which relative to a reference voltage indicates the direction of the member from the programmed location.

Still referring to FIGURE 1, to provide an extremely fine resolution, in addition to the rotary resolvers, a linear resolver 102 or induction device is mounted between the saddle and a fixed element, and a similar resolver 104 is mounted between the table and a fixed element. Electrically the linear fine resolvers are equivalent to the rotary resolvers of coarser resolution and provide error voltages of a similar form.

It will be seen by reference to FIGURE 1 that with this arrangement of resolvers of successively finer resolution, in the operation of the control system each resolver is connected to supply its error signal to an amplitude switch designated by blocks so labelled in FIGURE 1. Each amplitude switch is adapted to conduct only when the amplitude of an error signal received from the associated resolver exceeds a predetermined magnitude. For example, if curve A (FIG. 1) represents the changing amplitude of the A.C. error signal of the coarse resolver 90 as the movable member approaches a programmed end point, the coarse amplitude switch will conduct during the period marked "*e*" and if curve B is a similar representation of the error signal of the coarse-medium resolver, the coarse-medium amplitude switch will conduct during each of the periods marked "*f*." In the operation of the circuit as the movable member approaches the programmed location, the input to the discriminator 96 is switched to successive resolvers at successive transfer points as the end point comes within the target ranges of the respective resolvers. For example, the transfer point from the coarse to the coarse-medium resolver, shown at the end of the period marked "*e*," is desirably substantially 9° from the null of the curve A, such that when the transfer is made the error signal from the coarse-medium resolver is at 90° from its null and thus at maximum amplitude. There is desirably a similar relation between the cut-off function of the coarse-medium amplitude switch and its resolver 91, and between the function of the medium amplitude switch and its resolver 92, etc., such that at each transfer point the output signal from the succeeding resolver will be at a maximum. For the purpose of carrying out this transfer function each amplitude switch has associated therewith a relay C, CM, M, MF or FA. Such relays, C, CM, M, MF, FA have contacts C1, CM1, M1, MF1, FA1 in a switching matrix for connecting the resolvers to discriminators 96, 97. As the machine tool operates to cause the milling cutter to approach an end point, as by movement of the table 20 in the +X direction, the coarse resolver 90 will produce an A.C. error signal, the amplitude of which approaches a null as depicted by the curve A in FIG. 1. For the period designated "*e*" while the amplitude of the error signal is sufficient to cause the coarse amplitude switch to conduct, the coarse relay C will be energized to connect the coarse resolver 90 to the discriminator 96 through the contacts C1 closed by its relay C. Thus in the target range of the coarse resolver 90, the coarse relay C operates to close contacts C1 while opening contacts C2 to associate the coarse resolver 90 with and disassociate the other resolvers 91–93, 102 from the discriminator 96. The coarse relay contacts C4 are opened to deenergize the lower section of the circuit.

When the amplitude of the coarse resolver error signal diminishes to a point desirably approximately 9° from its null, the coarse amplitude switch deenergizes the coarse relay which causes its contacts C1 to drop out and disconnect the coarse relay, while its normally closed contacts C2 and C4 close to transfer the operation of the discriminator to the coarse-medium resolver 91. Upon such transfer, the end point is said to be within the target range of the coarse-medium resolver and the amplitude of the error signal from such resolver will be at a maximum approximately 90° from the null (the 25% point referred to in FIG. 1) as at the peak of the curve A in FIG. 1, the curve B now representing the amplitude of the A.C. error signal from the resolver of next finer resolution, herein shown as the medium resolver 92. The coarse-medium amplitude switch will now conduct to energize the relay CM, close its contacts CM1 and open its contacts CM2 to associate the coarse-medium resolver 91 while disassociating the other resolvers 92, 93, 102 from the discriminator 96. Also contacts CM4 are opened upon the coarse-medium relay CM being energized to deenergize the other relays M, MF, FA, +S and —S.

Now turning to FIG. 3, there is here shown the illustrative control circuit for operating the machine tool transmissions of FIG. 2 to cause the machine tool members to execute the motions required to carry out the picture frame milling mode of operation described in the above section on a box-like workpiece having an upper surface which is to be machined to a high degree of flatness. Taking, for example, the starting point for the machining process to the point so designated in FIG. 2, the machining can be carried out by movement of the machine tool members, so that the face milling cutter will move from the starting point along the X axis to the first end point I, then along the Y axis to the end point II, along the X axis to the end point III, along the Y axis to the end point IV, and to the starting point. Were usual machining modes to be followed, the machine tool members would be caused to stop at each end point before the start of the motion along the new axis begins. In carrying out the picture frame milling mode in machining of this workpiece, however, the motion of the machine tool members is caused to continue as the milling cutter turns the corner at each end point. For this purpose, at some position in the X axis motion toward end point I, the Y axis drive (saddle transmission) will start while the X axis drive (table transmission) continues, to produce movement at 45° from the X and Y axes. The X axis drive will stop responsive to the milling cutter reaching the end point I along the X axis while the Y axis drive continues to run. The operation will be similar at each of the other end points II, III and IV. In stopping the milling cutter at the starting point after turning the corner at the end point IV and proceeding along the X axis toward the starting point, the machine tool control system will operate in the usual manner wherein the tape reader A after reading out the block of data corresponding to the X axis positioning toward the starting point will encounter a hold-back restraint preventing data in the succeeding block of tape from being transmitted through the control system to change the motion of the machine tool members. With the milling cutter at the starting point, the Run circuit of FIG. 3 may be deenergized by punching the STOP switch and the machine tool cutter shifted manually or through usual programming techniques the cutter may be displaced from the workpiece.

Accordingly, each block of data on the tape will include, as mentioned above, data which will cause the clutches of the feed transmission or drive transmission to be set to provide the requisite relative machining rate. With relative movement along the X axis called for, for movement of the milling cutter to the end point I, for example, the electrical control system portion revolving about the synchronizing circuit shown in FIG. 3 controls the transmission to cause the machine tool members to move in the required direction. Thus, with the X axis end stepping switches set on a position representing the end point I, the control system acknowledges an error signal produced by the coarse resolver 90 which will produce +X motion. X axis motion will be caused by driving the table 20 at the programmed machining rate. Motion of the table in the +X axis direction is caused by energizing the + axis direction clutch winding 106 in FIGURE 2 and by suitably setting the feed drive clutches (not shown) in the table transmission. Referring to FIG. 3, this direction clutch winding 106 is found in the X axis direction circuit at the upper part of the figure. To produce movement in the (—) direction, the other direction clutch winding 108 would be energized.

In a like manner movement of the saddle along the Y axis in the appropriate direction is provided by selectively energizing direction clutch windings in the Direction Circuit Y-Axis depicted in block form in FIG. 3, and by suitably setting the feed drive clutches (not shown) in the saddle transmission.

How the direction clutch windings are selectively energized responsive to resolver error signals will be seen by reference to FIGURE 1. The output signal of each resolver is applied to an associated amplitude switch. For example, with the face milling cutter in the target range of the coarse resolver from end point I, then the coarse amplitude switch will convey energizing current to the coarse relay C, causing the same to pick up its contacts C1 in the circuit to the discriminator 96. The discriminator 96 is a suitable device, such as a phase-sensitive rectifier bridge, for example, shown and described in detail in the foregoing mentioned United States Patent No. 3,040,221 (FIG. 9), which provides an output signal having a polarity which indicates the direction (+) or (—) along the X axis to the end point. In the present case, the direction is (+) and, accordingly, the output signal from the discriminator is positive. To control the direction in which the machine tool members move, there is connected to each output terminal of the discriminator an individually associated thyratron coupled to control a direction relay +D, —D. Thus the direction relay +D is operated as in the present case, if the machine tool table is required to move in a + direction along the axis of control to reach the programmed end point, and the direction relay —D is operated if the machine tool table is required to move in the opposite (—) direction along the same axis to reach the programmed end point.

The discriminators 96, 97 are located in a synchronizing circuit, as shown in FIGURE 1, which circuit includes a matrix of relay contacts C1, C2, CM1, CM2, M1, M2, MF1, FA1, which cause the control over the motion of the machine tool members to be switched from the resolvers of coarser resolution to those of finer resolution as the machine tool members move toward the end point through the target ranges of the resolvers. Thus, when the relay C operates responsive to the detection by the coarse resolver 90 of an error signal, contacts C1 of this coarse relay C close to connect the coarse resolver 90 to the discriminator 96 and other contacts C2 open to break connection with the other resolvers 91, 92 and 93. When a null error signal is produced responsive to the coarse resolver 90 being satisfied, the coarse relay C drops out its contacts C1 and the contacts C2 pick up to connect the medium coarse resolver 91 to the discriminator 96. In this manner as the machine tool members move from the target range of a coarser resolver into the target range of a resolver of finer resolution, the discriminator 96 is disconnected from the coarser resolver and connected to the finer. The sense of the error signal remains the same; therefore, either the +D or the −D relay connected to the output of the discriminator 96 will be held energized as the circuit switches from target range to target range.

In addition to the switching matrix associated with the coarse, medium-coarse, medium and medium-fine resolvers 90, 91, 92 and 93, there is also shown a fine resolver 102 and a discriminator 97 having stop relays +S and −S. It will be seen from FIG. 1 that in the target range of the fine resolver 102, this resolver will be connected to both discriminators 96, 97 of the synchronizing circuit. As set forth in detail in my U.S. Patent No. 3,040,221, above referred to, such discriminators produce A.C. control signals for the thyratrons T1 or T2, the magnitude of which control signals is proportional to the amplitude of the incoming resolver produced error signal. The signal appearing at the terminals designated (+) will be 180° displaced in phase from the signals appearing at the (−) terminals. Whenever the error signal applied to one of the discriminators is above a predetermined magnitude (determined by the settings of P1, P2, P3, P4) one of the pairs of thyratrons T1, T2 will conduct during a portion of each cycle of the reference 115 v. A.C. voltage, depending upon whether that error signal is of one phase or the other; i.e., whether the position error is of a positive or negative sense, thereby selectively energizing the relays +D or −D, +S or −S. The thyratrons T1, T2 shown in FIG. 1 in the output circuits of the discriminators 96, 97 are shown as part of the discriminator circuit in said FIG. 9 of said U.S. patent. As the output signal from the fine resolver 102 approaches its null, the fine amplitude switch opens to drop out the fine relay FA thereby opening its contacts FA1 (FIG. 1). Since there is no resolver error signal thereafter applied to the coarse discriminator 96, the thyratrons T1 in its output will be held off, causing the +D or −D relay to drop out. The effective stop relay +S or −S remains picked up until the fine resolver signal diminishes to within a narrower dead band provided by the setting of the potentiometers P3 and P4 of the thyratrons T2 of the fine discriminator 97, to precisely stop the machine tool member at the programmed end point by dropping out the contacts of the stop relays +S or −S in the Direction and Stop circuits and, if desired, by operating the brakes of the transmission (FIG. 2) responsive thereto. In this manner, a direction relay +D or −D is held operated as the machine members move into the target range of the fine resolver 102. After reaching the 38% point in the output of the fine resolver in the usual operation of the circuit, relay FA drops out releasing its contacts FA1 and thereby disconnecting the fine resolver 102 from the coarse discriminator 96. The effective one of the thyratrons T1 will be held off and the direction relay +D or −D released. One of the stop relays +S or −S has been operated by firing of one of the thyratrons T2 responsive to a control signal from the fine discriminator 97 which is still connected to the fine resolver 102 causing the respective stop relay +S or −S to close its contacts in the circuit to the direction clutch windings, as shown in FIG. 3. This readies the direction circuit for release in a simple and expedient manner. When the error signal from the fine resolver 102 virtually disappears, or produces a null signal, the effective one of the thyratrons T2 in the output of discriminator 97 connected to this fine resolver is held off to drop out the effective one of the stop relays +S or −S, causing one of the latter to release its contacts in the direction circuit to deenergize the circuits to the direction clutch windings 106, 108 and thereby disconnect the drive from the machine tool members. In the present case of movement along the X axis to an end point I, this would mean disconnection of the direction clutches in the table drive.

In carrying out one of the main features of the present invention, to produce continuous movement without dwell of the milling cutter upon change of its direction of motion at an end point, means is provided for automatically starting the drive along the new axis before the end point is reached. This is achieved, in keeping with the invention, by utilizing a signal from the synchronizing circuit of FIGURE 1 produced responsive to movement of the machine members from the target range of one resolver into the target range of a resolver of finer resolution. In the present case, the drive along the new axis is started when, in the movement of the members toward an end point, the milling cutter reaches a point 0.25″ from the programmed end point. It will be understood that this is the switching point into the target range of the medium fine resolver 93. If it were to be preferred to start the new axis drive at .025″ from the end point, such could readily be achieved, in keeping with the invention, by making the control responsive to movement of the members into the target range of the fine resolver 102.

Referring to FIGURE 1 and also to the control circuit in FIG. 3, in the operation of these circuits where constructed and arranged to be responsive to movement of the members to a point displaced 0.25″ from the end point, in moving progressively closer to the end point I through the target range of the medium resolver 92, the latter will produce an error signal causing the medium amplitude switch to energize the medium relay M. The medium relay M will drop out and the medium-fine relay MF will be energized responsive to the machine tool members reaching a point displaced 0.25″ from the end point I. Referring to FIG. 3, certain conventions have been followed. Each relay winding is identified as a circle including a reference symbol which identifies the relay. All contacts, both normally opened and normally closed are shown by appropriate notations in FIG. 3, there being a reference symbol adjacent each contact, the first symbol indicating the operating relay which controls the designated contacts and the following numeral identifying a particular set of contacts on the operating relay. Each time that it is necessary to refer to equipment associated with a particular axis of machine motion, such motion is indicated by a suffix including the reference letters "X" or "Y," as the case may be. Still referring to FIG. 3, the change of state of the medium and medium-fine relays M, MF of the X axis Synchronizing Circuit may be utilized in a convenient and expedient manner by means of the X axis Stop Circuit. To this end, a cut-in relay CR-X in the X axis Stop Circuit is energized responsive to the medium relay M being deenergized and the medium-fine relay MF being energized. This relay CR-X is in series with contacts PF1 of a picture frame milling relay PF included in a picture frame milling mode relay circuit shown in block form in FIG. 1 and in greater detail in FIG. 4. The picture frame milling relay PF is energized by a signal from the data reader A responsive to coded data in the first block of a series on the tape controlling operation of the machine tool according to the picture frame milling mode. Contacts PF1 are operated by the relay PF to serve as an interlock which closes the circuit to the CR-X relay while the machine tool work cycle is operating under the picture frame milling mode.

Relay MMF-X (medium to medium-fine) operates via any one or more of the contacts C8X, CM8X, or M8X any time that an error signal is produced by coarse, coarse-medium, or medium resolvers 90–92. This relay MMF-X drops out allowing contacts MMF2-X to close responsive to X axis motion moving out of the target range of the medium resolver. At the same time, the error signal from the medium-fine resolver 92 (referring to FIG. 1) conveyed through the medium fine amplitude switch causes the relay MF to be energized closing its contacts MF5-X (FIG. 2), thereby energizing the cut-in relay CR-X indicating that the X axis motion is 0.25" from the programmed end point. How the Y axis motion is started by energizing the cut-in relay CR-X will next be set forth.

Y axis motion is started by energizing a start relay SR-Y in the Y axis position circuit. The contacts ERX in the circuit to the start relay SR-Y are held open until the end point for the X axis motion is reached. Accordingly, contacts CR1-X of the cut-in relay CRX are connected in parallel with the contacts ERX so as to energize the start relay SR-Y before the X axis end point is reached.

The control thus ascertains, for producing simultaneous X and Y axis motion to cut across the corner at the first end point I, that the following conditions are satisfied:

(a) That the machine is operating under the picture frame milling mode. Coded data at the beginning of a series of blocks on the tape energizes the picture frame milling mode relay PF. Such calls for cutting in the second (Y axis) feed at the anticipation point ahead of the end point I, for example.

(b) That the first feed has reached the anticipation point, indicated by the cut-in relay CR-X being energized;

(c) That the data for the second feed is in storage; the read-in having been completed responsive thereto, the Y axis end position stepping switches are set to store the Y axis end point. Interlock circuits perform the checking on this condition.

Termination of simultaneous X and Y motion is achieved by locking out clutch 106 or 108. The lockout is achieved responsive to the start relay SR-X dropping out which occurs with the X axis end point being reached and the stop relays +S and —S dropping out their contacts +S5 and —S5 and the fine relay FA dropping out its contacts FA8-X (contacts MMF1-X are already open). Dropping out the start relay SR-X opens the contacts SR1-X and SR2-X, thereby locking out the effective one of the direction clutches 106, 108. With the X axis motion completed, the cut-in relay CR-X is dropped out by the opening of the contacts S6 or —S6 in its circuit thereby returning the Y axis position circuit to normal.

It will be readily understood that the change in motion from feed along one axis to simultaneous feed along both axes could be started at some other distance from the end point than 0.25". For example, the motion change could be started at 0.25" by causing the cut-in relays CR-X and CR-Y to operate responsive to motion out of the medium-fine resolution range of the resolvers into the fine resolution range, by suitable circuits producing a signal to energize the cut-in relays upon a null signal from the medium-fine resolver.

It is believed that the operation of the machine tool members under the picture frame milling mode, in moving to succeeding end points II, III and IV, will be apparent from the foregoing description. To briefly summarize, however, as the machine tool members move along the Y axis progressively closer to end point II, and move out of the medium resolver range into the medium-fine range (0.25" from the second end point II), movement along the Y axis will continue without change in the programmed feed rate and X axis motion in the (—) direction will start so that the members move 45° relative to the X and Y axes. Such X axis motion is responsive to a null signal from the medium resolver causing the Y axis cut-in relay CR-Y to be energized. Contacts CR1-Y in the X axis position circuit connect a source of potential to the SR-X relay operating the latter to start X axis motion as programmed. At the Y axis end point II, motion along the Y axis will stop while X axis motion will continue. The cut-in relay CR-Y will drop out and the normally closed contacts ER1-Y, closed contacts PR1-X, and one of the contacts MMF1-X, +S5-X, —S5-X, FA8-X, or MF6-X which will be closed by the corresponding relay of the X axis synchronizing circuit, will maintain the X axis circuits activated.

The operation is similar approaching the third end point III, and the fourth end point IV. With movement from the medium target range into the medium fine target range along the (—)X axis, Y axis motion is started to produce cutter movement at 45°. Upon reaching the end point III, X axis motion stops and Y axis motion continues to move the members to the end point IV. Upon reaching the end point IV, Y axis motion stops and X axis motion continues to return the members to the starting point.

It is sufficient for present purposes to note that the picture frame milling mode relay PF is energized responsive to a mode selection signal transmitted from a tape reader or data input device A upon read-out of a block of data beginning a series of machining operations involving movement to successive end points and for which it is desired that the machine tool operate according to this mode. An exemplary circuit including this relay PF is depicted in FIG. 4. The picture frame milling mode relay PF will operate upon transmission of a tape derived signal over a line to the relay coil, said relay being sealed in upon its contacts PF3 being closed. Once this mode relay PF is energized and sealed in, the milling cutter will be caused to turn the corner without dwell at succeeding programmed end points (illustrative I, II, III and IV) where the blocks of data corresponding to the machining steps to such end points contain digital information designating appropriate feed rates and axis motion. The milling cutter will be stopped at the "starting point" after turning the corner at end point IV, by programming the "starting point" as an end point in the corresponding block of data designating X axis motion thereto, and where the reader is held from reading any succeeding block of data on tape. With the milling cutter at the starting point, the machine may be operated manually after the Run circuit is deenergized by punching the "stop" switch in the Run circuit of FIG. 3, said stop switch having a second set of contacts in the PF relay circuit of FIG. 4 to drop out the PF relay. For simplicity the reader operating circuits have been omitted, such being conventional and forming no part of the present invention.

Referring to FIG. 5, this figure illustrates the overall control system for positioning the table 20 along the X axis and the saddle 22 along the Y axis. In summary, in the operation of the control system to drive the machine tool members to a programmed end point, a coded end point signal read from a block of data on the tape by the data reader A is transferred to set up the end position stepping switches to a condition representing the end point. If such end point is designated along the X axis, for example, the end position stepping switches for such axis will be set, the digital analog converter L for the X axis then producing electrical signals representing the end point, in the form of voltages proportional to the sine and cosine function of the angle $\theta$ which corresponds to a desired linear position on the X axis of the table 20. Such sine and cosine voltages are provided by the converter L for each of the X axis sychronizing circuit resolvers J. If any of the rotors of the resolvers J is at any angle except $\theta$ representing the desired position, an error voltage proportional to the angular displacement therefrom is induced in the resolver rotor, it being understood that the scale of the fine resolver 102 is the equivalent of the rotor of the coarse, coarse-medium, medium and medium fine rotary resolvers 90, 91, 92, 93, respectively. Also referring to FIG. 1, with the table in the target range of one of the resolvers of coarser resolution, the error signal from either the coarse, coarse-medium, medium or medium fine resolvers 90-93 will be conveyed to the coarse discriminator 96, and one or the other of the +D or —D relays in its output circuit will be energized via the thyratrons T1. As the table moves into the target range of the fine resolver 102 (FIG. 1), the error signal from the fine resolver will be conveyed to both the coarse discriminator 96 and the fine discriminator 97 holding one or the other of the +D or —D relays energized, and also energizing one of the +S or —S relays in the output circuit of the fine discriminator 97. As explained above, illustratively as the table 20 moves closer toward the end point, the fine resolver is disconnected from the coarse discriminator 96 dropping out the effective one of the +D or —D relays while the fine resolver 102 remains connected to the fine discriminator 97 holding the effective one of the +S or —S relays energized until the end point is reached. This provides overlap in the successive operation of the +D, —D, and +S, —S relays which affords an accurate termination of the motion of the machine tool members at the programmed end point.

The control circuit of FIG. 1, herein called the synchronizing circuit, operates the direction, run and stop circuits, which is diagrammatically illustrated in FIG. 5. These direction, run and stop circuits in turn operate the table transmission to position the table along the X axis, and in the operation of the control system for movement of the saddle along the Y axis, operate the transmission for the saddle. Still referring to FIG. 5, the resolver rotors are mechanically driven via gear reduction devices included in the transmission so as to feed back actual position information as the machine tool components move toward the programmed end point, which is diagrammatically illustrated in this figure.

Where in a block of data on the tape a coded selection signal is included designating the picture frame milling mode of operation, the data reader A provides a signal to the milling mode relay circuit (FIGS. 1, 5). Referring to FIG. 4, such signal energizes the picture frame milling mode relay PF. This picture frame milling mode relay PF operates certain contacts in the direction, run and stop circuits shown in FIG. 3 to modify the motion of the machine tool members according to the picture frame milling mode. For example, with the machine tool table at the starting point, and the first block of data on the tape containing coded selection signals designating movement to the end point I, and also designating the picture frame milling mode relay, upon the start switch being closed (FIG. 3), the position relay PR will be energized and sealed in upon its contacts PR4 being closed. With the table in the target range of the coarse, coarse-medium or medium resolvers 90–92, one of the coarse, coarse-medium or medium relays C, CM or M will be energized and the contacts thereof C8-X, CM8-X, or M8-X will be closed to energize the medium-medium fine relay MMF-X included in the stop circuit of FIG. 3. The medium-medium fine relay MMF-X closes its contacts MMF1-X in the circuit for the start relay SR-X. The other contacts for energizing the start relay SR-X (PR1-X, ER1-Y) are closed so that such relay SR-X is energized.

It will be noted from FIG. 3 that contacts of the start relay SR-X are provided in the energizing circuit for the direction clutch windings 106, 108. With the table 20 displaced from the end point I, one of the contacts C3-X, CM3-X, M3-X, MF3-X, FA3-X, +S3-X or —S3-X will be closed by the corresponding relay in the X axis synchronizing circuit of FIG. 1. Since movement in the +X direction is required to move the table 20 to the end point I, the +X direction clutch winding 106 is required to be energized. This is achieved by the +D-X relay being energized via the coarse discriminator 96 and its output thyratrons T1, which causes the contacts +D1-X of said direction relay +D being closed, the contacts —D2-X and —S2-X being normally closed such that a complete circuit is provided to the +X direction clutch windings 106 to start motion of the table 20 via its transmission.

According to the picture frame milling mode of operation, motion along the Y axis starts in the —Y direction before the first end point I has been reached. After the corner has been turned and the end point I reached in the +X direction, the +X direction clutch winding 106 is deenergized to stop X axis motion while —Y axis motion is continued. This is achieved by means including the cut in relay CR-X illustrated in FIG. 3. The cut in relay CR-X in the operation of the circuit responds to the medium-medium fine relay MMF-X being deenergized as the table moves out of the target range of the medium resolver 92 and into the target range of the medium fine resolver 93. For this purpose, the cut in relay CR-X is in series with normally closed contacts MMF2-X of the medium-medium fine relay MMF-X such that when the latter relay drops out, the circuit to the cut in relay CR-X is completed and the relay is energized. CR1-X contacts of the cut in relay CR-X are in the energizing circuit for the start relay SR-Y so that when such contacts are closed, the SR-Y relay will be energized to start the Y axis drive via direction clutch windings in the Y axis direction circuit. It is noted that the circuit to the SR-Y relay will be completed through closed contacts ER1-Y contacts will be held open by the ER-Y relay or MMF1-Y, one of which contacts will be closed by the corresponding relay so long as the machine tool members are displaced from the end point along the Y axis. The ER1-Y contacts will be held open by the ER-Y relay which is energized designating that Y axis motion is called for in the succeeding Y axis machining step, such that the cut in relay contacts CR1-X in parallel with the contacts ER1-Y will complete the circuit to the start relay SR-Y. In operation, the ER-Y relay is energized via the paralled contacts +D3-X, —D3-X, +S7-X, —S7-X one of which will be closed by the corresponding relay (FIG. 1) where the machine tool saddle is displaced from the end point, the contacts PR2-X also being closed by the position relay PR when the system is in operation.

To stop X axis motion at the end point I, one or the other of the effective stop relay contacts +S5-X or —S5-X will be dropped out to open the circuit to the start relay SR-X, deenergizing the latter and causing its contacts SR1-X, SR2-X to be opened in the X axis direction clutch windings circuit.

In the foregoing manner, according to the picture frame milling mode of operation, the Y axis is started just ahead of the table reaching the end point I by means of the cut in relay CR-X. In turning the corner, both the X axis and Y axis drives are used to obtain simultaneous motion on both axes to avoid dwell at the end point. The X axis drive of the table 20 is stopped once the end point I has been reached upon denergization of the stop relays +S or —S (FIG. 1), the Y axis drive continuing to move the saddle towards the next end point herein shown as the end point II. The operation of the control system to turn the corner at the succeeding points II, III and IV is similar to that just described in that motion along the succeeding axis is started ahead of the end point to obtain simultaneous drives along both axes until the end point has been reached and thereafter continuing the drive along the new axis. In this manner, the machine tool components are brought past the end point IV and moved along the X axis in the + direction to the starting point to complete the picture frame milling operation.

I claim as my invention:

1. In an automatic machine having movable members and separate drive means for moving said members, respectively, relative to each other in either direction along either of two orthogonal axes to programmed end points along said axes, the combination comprising, error detecting elements of progressively finer resolution associated with each axis for comparing the physical location of each of said members with a programmed end point along the respective axis and for transmitting error signals as each of the members progress through the resolution ranges of the elements which are a function of the remaining distance thereto, said elements being progressively satisfied to produce a null error signal, means for operating a first one of said drive means to move said members relatively along one axis toward a programmed end point along said one axis, means responsive to a null error signal from an error detecting element associated with said one axis for operating both said drive means at a point displaced from said programmed end point to move said members simultaneously along both axes, and means responsive to a null error signal from an error detecting element of finer resolution than said first named element indicating the programmed end point has been reached along said one axis for continuing the operation of the other of said drive means and for halting the operation of the first of said drive means so that said members continue to move relatively along only the other of said axes.

2. In an automatic machine having movable members and separate drive means for moving said members, respectively, relative to each other in either direction along either of two orthogonal axes to programmed end points along said axes, the combination comprising, error detecting elements of progressively finer resolution associated with each axis for comparing the physical location of said members along the respective axis with the end point and for transmitting error signals as the members progress through the resolution ranges of the elements which are a function of the remaining distance thereto, said elements being progressively satisfied to produce a null error signal, means for operating a first one of said drive means to move said members relatively along one axis toward a programmed end point along said one axis, means responsive to a signal from an error detecting element associated with said one axis representing a predetermined displacement from said programmed end point for operating both said drive means to move said members simultaneously along both axes, and means responsive to a signal from an error detecting element of finer resolution than said first named element indicating the programmed end point has been reached along said one axis for continuing the operation of the other of said drive means and for halting the operation of the first of said drive means so that said members continue to move relatively along only the other of said axes.

3. In an automatic machine having movable members and separate drive means for moving said members, respectively, relative to each other in either direction along either of two orthogonal axes to programmed end points along said axes, a system for controlling the motion of said movable members to successive positions along different axes in accordance with a program of successive positioning steps represented by successive blocks of data on a record medium, each block of data including indicia representing an end point along an axis of motion to which said member is to be moved, said system comprising in combination, a reader for successively sensing the blocks on said record medium and converting the indicia in each block into end point representing signals, control means connected to receive said end point representing signals and operative to cause one of said drive means to move one of said members to an end point along the programmed axis of motion, error detecting elements of progressively finer resolution associated with each axis for comparing the physical location of each of said members with a programmed end point along the respective axis of motion and for transmitting error signals as each of the members progress through the resolution ranges of the elements which are a function of the remaining distance thereto, said elements being progressively satisfied to produce a null error signal, and means responsive to a signal from an error detecting element associated with the axis of motion representing a predetermined displacement from the programmed end point for operating both said drive means to move said members simultaneously along both axes, and means responsive to a signal from an error detecting element of finer resolution than said first named element indicating the programmed end point has been reached along the axis of motion for continuing the operation of the other of said drive means and for halting the operation of the first of said drive means so that said members continue to move relatively along only the next axis of motion toward the next end point.

4. In an automatic milling machine having movable members and a milling cutter and separate drive means for moving said members, respectively, relative to each other to move said milling cutter in either direction along either of two orthogonal axes to end points along said axes, a system for controlling the motion of said movable members to move said milling cutter through a milling mode to successive end points with each successive end point being along a different axis, said successive end points being in accordance with a program of successive positioning steps represented by successive blocks of data on a record medium, each block of data including indicia representing an end point along a single axis of motion to which said member is to be moved, said system comprising in combination, a reader for successively sensing the blocks on said record medium and converting the indicia in each block into end point representing signals, control means connected to receive said end point representing signals and operative to cause said drive means to move said members so as to move said milling cutter to said successive end points, error detecting elements of progressively finer resolution associated with each axis for comparing the physical location of said members along each axis of motion with an end point programmed along the respective axis and for transmitting error signals as the members progress through the resolution ranges of the elements which are a function of the remaining distance thereto, said elements being progressively satisfied to produce a null error signal, means responsive in the progress of the motion of the members toward each end point to a signal from an error detecting element representing a predetermined displacement from the end point for operating both said drive means to move said members simultaneously along both axes, and means responsive to a signal from an error detecting element of finer resolution than said first named element indicating the programmed end point has been reached along one axis of motion for continuing the operation of the other of said drive means and for halting the operation of the first of said drive means so that said milling cutter moves past each end point from motion along said one programmed axis to motion along the next programmed axis without dwell at the end point.

References Cited in the file of this patent
UNITED STATES PATENTS

| | | |
|---|---|---|
| 2,262,399 | King | Nov. 11, 1941 |
| 2,820,187 | Parsons | Jan. 14, 1958 |
| 2,875,390 | Tripp | Feb. 24, 1959 |
| 3,016,778 | Fitzner | Jan. 16, 1962 |